United States Patent [19]

DenBleyker

[11] Patent Number: 5,022,347
[45] Date of Patent: Jun. 11, 1991

[54] DRY FEED DISPENSING DEVICE FOR HOGS

[75] Inventor: James R. DenBleyker, Holland Township, Ottawa County, Mich.

[73] Assignee: Big Dutchman Cyclone, Inc., Holland, Mich.

[21] Appl. No.: 462,133

[22] Filed: Jan. 8, 1990

[51] Int. Cl.⁵ .............................................. A01K 5/00
[52] U.S. Cl. ...................................... 119/54; 222/322
[58] Field of Search ................ 119/51.04, 51.5, 53.5, 119/54, 56.1, 57.91; 222/319, 322, 404, 408.5

[56] References Cited

U.S. PATENT DOCUMENTS

| | | | |
|---|---|---|---|
| 1,173,481 | 2/1916 | Bussey | 222/322 X |
| 2,227,706 | 1/1941 | Conner | 222/322 |
| 3,677,230 | 7/1972 | Braden | 119/51.04 |
| 3,780,701 | 12/1973 | Wentworth, Sr. | 119/53.5 X |
| 4,799,455 | 1/1989 | O'Kelley | 119/54 X |

OTHER PUBLICATIONS

Copy of Funki Brochure Disclosing RA-DOS Dry Feed Unit (2 pages).

Primary Examiner—Robert P. Swiatek
Attorney, Agent, or Firm—Flynn, Thiel, Boutell & Tanis

[57] ABSTRACT

A device for dispensing dry feed to animals, particularly hogs, including a housing having an interior storage chamber for dry feed. An animal-actuatable valve projects downwardly through a discharge opening formed in the lower end of the housing to permit controlled dispensing of dry feed. The valve element has an upper valve plate disposed within the feed chamber for normally closing off the discharge opening, and an elongate actuator rod is fixed to the upper valve plate and projects downwardly for actuation by the animal. The valve plate is preferably of a downwardly-opening truncated conical configuration to permit scooping of feed into the discharge opening during oscillation of the valve element. The housing, in a preferred embodiment, has a sleevelike shroud fixed thereto and projecting downwardly from the discharge opening so as to extend partially along the actuator to prevent moisture from coming into close proximity to the discharge opening.

17 Claims, 2 Drawing Sheets

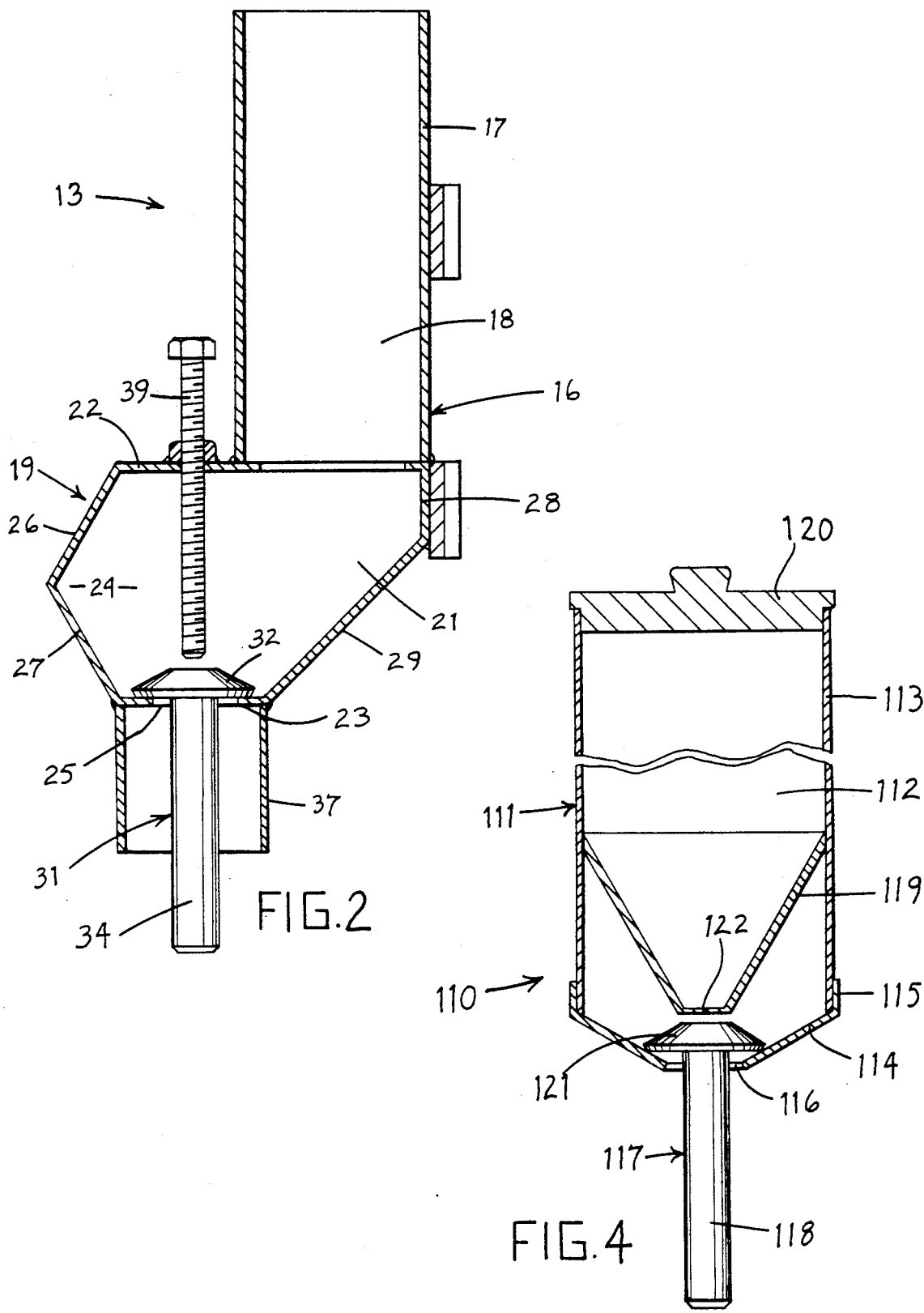

5,022,347

DRY FEED DISPENSING DEVICE FOR HOGS

FIELD OF THE INVENTION

This invention relates to a device for dispensing dry feed to hogs and, more particularly, to an improved feeder device which is less sensitive to plugging up due to moisture and which provides better control over the dispensing of feed.

BACKGROUND OF THE INVENTION

In the raising of hogs, it is conventional to provide a feed trough having both a dry feed dispensing device and a watering device mounted thereon, which devices each have a shut off valve or element activated by the hog's snout when dispensing of feed or water is desired. In one known device, there is provided a vertically elongate chamber for containing dry feed therein, and the bottom of this chamber is closed by a closure plate or valve which is hinged at one edge of the chamber and is suitably counterbalanced so as to normally remain closed. By pressing its snout against the counterbalanced portion of the closure plate, the hog can open the plate to permit dispensing of dry feed. With this mechanism, however, it has been observed that the feed adjacent the closure plate picks up moisture from the hog's snout, and hence the feed tends to bridge and thus prevent free flow of feed from the feeding device, even when the closure plate is opened. Further, adjusting the feed dispensing rate is difficult.

Accordingly, it is an object of this invention to provide an improved dispensing device for dry feed, particularly for hogs, which feed dispensing device can be actuated by a hog but which is believed to significantly overcome the problems associated with prior feeders, as described above.

In the improved feed dispensing device of the present invention, the bottom of the feed chamber defines a discharge opening which is normally closed by a valve element which is activated by the hog. This valve element includes a closure part which normally closes off the discharge opening, and also includes an elongate actuator part which projects downwardly therefrom so as to be engaged and displaced by the hog. The dispensing device also includes a sleeve part which is fixed to the housing and projects downwardly from the discharge opening in surrounding relationship to the actuator part. This sleeve requires that the hog contact only the lowermost free end of the elongate actuator part, and maintains the hog's snout spaced downwardly a substantial distance below the discharge opening, thereby effectively preventing moisture from gaining access to the region of the feed discharge opening. The closure part is disposed within the feed storage chamber and has a generally downwardly opening, cup-shaped configuration to control the dispensing rate of the feed.

Other objects and purposes of the present invention will be apparent upon reading the following specification and inspecting the accompanying drawings.

BRIEF DESCRIPTION OF THE DRAWINGS

FIG. 2 is a central sectional view of the improved feed dispensing device.

FIG. 4 is a central sectional view, in elevation, of a modification.

Figure 1:
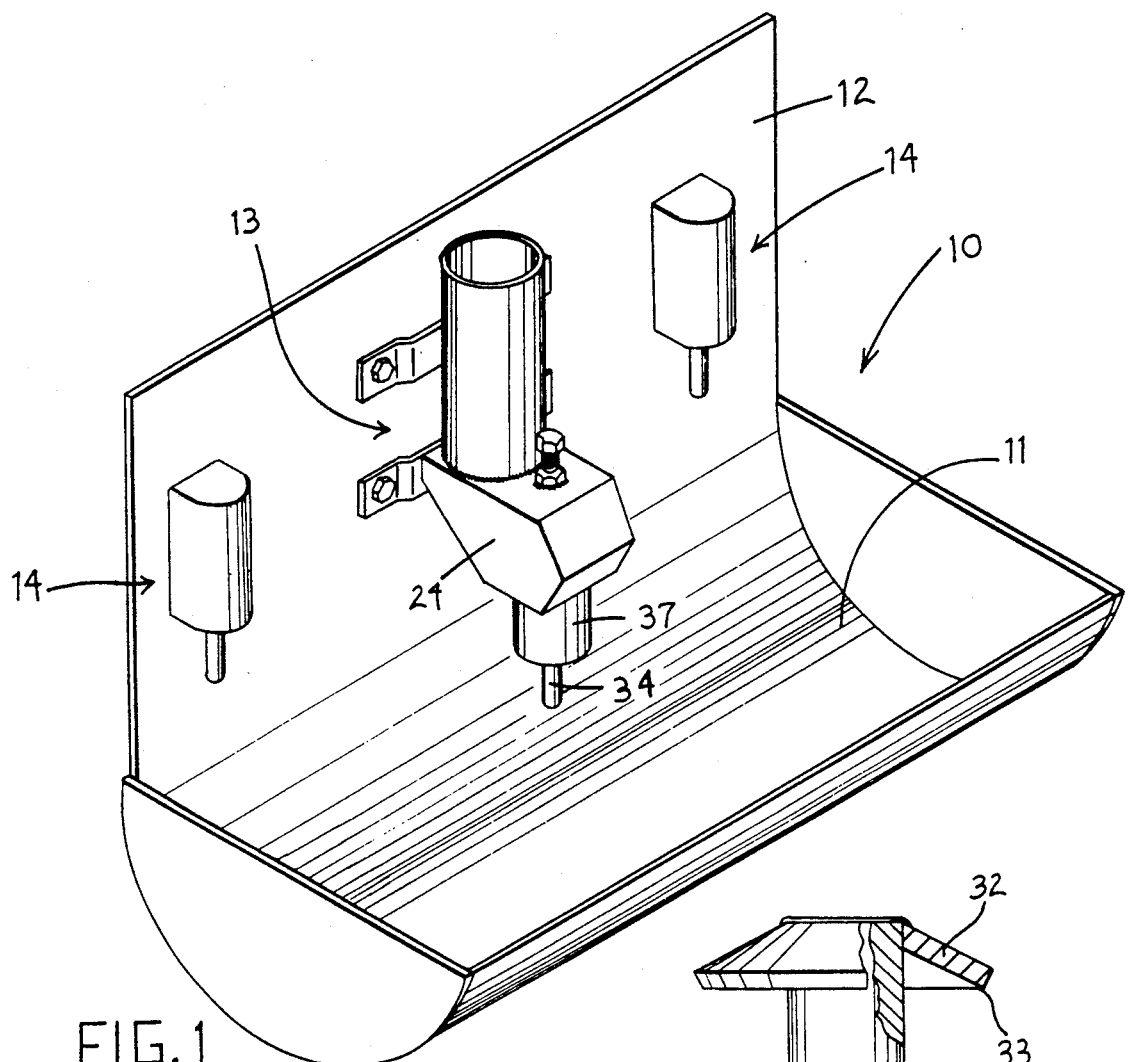
FIG. 1 is a perspective view of a feed trough mounting thereon a conventional watering device and also mounting thereon the improved dry feed dispensing device of the present invention.

Certain terminology will be used in the following description for convenience in reference only, and will not be limiting. For example, the words "upwardly", "downwardly", "rightwardly" and "leftwardly" will refer to directions in the drawings to which reference is made. The word "downwardly" will also refer to the normal flow direction of feed through the device. The words "inwardly" and "outwardly" will refer to directions toward and away from, respectively, the geometric center of the device and designated parts thereof. Said terminology will include the words specifically mentioned, derivatives thereof, and words of similar import.

DETAILED DESCRIPTION

Referring to FIG. 1, there is illustrated a conventional feed trough structure 10 which defines therein an upwardly opening trough 11 into which dry feed and/or water is deposited for feeding hogs. This trough structure 10, in the illustrated embodiment, has an upwardly projecting rear wall 12 on which is mounted a feed dispensing device 13 for permitting dispensing of dry feed into the trough, which device 13 is activated by the hog to permit selective dispensing of dry feed. The feeder device 13 conventionally has the upper end thereof connected to a downwardly directed feed supply tube, the latter in turn being connected to a horizontal feed supply tube having an internal rotatable auger therein for permitting automatic supply of feed to the feeder device, such automated feed supply systems being conventional. Alternatively, the feeder device can be manually filled if desired.

The trough 10 in the illustrated embodiment also has one, and as shown two, conventional nipple-type watering devices 14 mounted thereon, the latter also being activated by the hog to permit selective flow of water into the trough.

Figure 3:
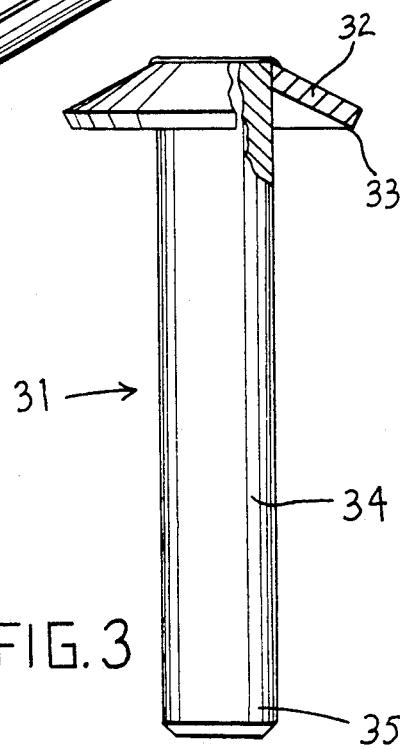
FIG. 3 is an enlarged elevational view, partially in cross section, of the valve element associated with the feed dispensing device.

Reference is now made to FIGS. 2 and 3 wherein the improved feed dispensing device 13 of the present invention is illustrated in greater detail.

The feed dispensing device 13 includes a housing 16 having an upper vertically elongate tubular part 17 which defines therein a feed storage chamber 18. The upper end of this tubular part 17 is normally connected to an automated feed supply arrangement, or alternatively can be provided with a removable cover to permit manual depositing of dry feed therein. The housing 16 also includes a lower boxlike housing part 19 which couples to the lower end of the upper tubular part 17 and which is hollow so as to define a lower feed storage chamber 21 therein, this chamber 21 being in open communication with and hence effectively constituting an extension of the upper chamber 18.

The lower boxlike housing part 19 includes generally parallel and horizontally-oriented top and bottom walls 22 and 23, respectively, the latter being rigidly joined together by generally parallel side walls 24 which extend therebetween. The bottom wall 23, at the center thereof, has a generally circular feed discharge opening 25 extending vertically therethrough. This feed discharge opening 25 has a diameter which is a substantial majority of the front-to-back width of the bottom wall 23.

The boxlike bottom housing part 19 also has a front wall 26 which is provided with a lower wall part 27 which converges inwardly for merger with the front edge of the bottom wall 23. In similar fashion, the lower housing part has a rear wall 28 having a lower wall part 29 which also converges or slopes inwardly for merger with the rear edge of the bottom wall 23. These bottom wall parts 27 and 29 each extend in nonperpendicular relationship to the bottom wall 23 and in fact slope outwardly away from the bottom wall 23 as they project upwardly. These bottom wall parts 27 and 29 thus define a generally converging funnel-like relationship as they project downwardly so as to assist in guiding the feed inwardly toward the discharge opening 25.

Flow of feed through the discharge opening 25 is regulated by a flow control valve or closure member 31, the latter being normally maintained in a closed position and being opened due to actuation thereof by the hog. This valve member 31 includes at its upper end a generally circular valve or closure plate 32 having an outer diameter which is slightly greater than the diameter of the discharge opening 25 so as to permit complete closure of the discharge opening. This valve plate 32 preferably has a truncated conical configuration which converges in an upward direction away from the lower free edge 33 thereof. This upwardly directed conical configuration results in the valve plate 32 making contact with the upper surface of the bottom wall 23 solely at a narrow annular band which is disposed in surrounding relationship to the discharge opening 25, which contact band occurs around the lower free edge 33 of the valve plate 32. This upwardly converging configuration also permits the feed which is disposed above the valve plate 32 within the lower chamber 21 to more readily flow downwardly off the upper surface of the valve plate.

Valve member 31 also includes an elongate actuator part 34 which is fixed to the center of the valve plate 32 and projects vertically downwardly therefrom. This actuator 34 is preferably constructed as a vertically elongate rod which terminates in a lower free end 35. Rod 34 and valve plate 32 are fixedly secured in any suitable manner, such as by welding. The actuator rod 34 projects vertically downwardly a substantial extent, preferably in the range of three to six inches below the valve plate 32.

The housing 16 also includes a protective shroud 37 which is fixed to the bottom wall 23 and projects downwardly therefrom. This shroud 37 is formed substantially as a cylindrical or tubular sleeve having its upper end fixedly secured, as by welding, to the bottom wall 23 so as to be concentrically aligned with the discharge opening 25. This shroud 37 generally concentrically surrounds the downwardly projecting actuator rod 34. Shroud 37 projects downwardly a substantial extent, which downward projection extends over a substantial part of but terminates short of the lower free end of the actuator rod 34. The inner diameter of this shroud 37 is significantly greater than the outer diameter of rod 34 so as to enable rod 34 to be relatively and easily angularly tilted relative to the vertical, as explained below. The shroud 37 preferably projects downwardly in the order of 2 to 4 inches, and preferably projects downwardly over at least 50 percent of the downwardly projecting length of the actuator rod 34.

As illustrated by FIG. 2, the lower housing part 19 and the chamber 21 defined therein project sidewardly (that is, forwardly) relative to the upright tubular housing part 17, and the discharge opening 25 as formed in the bottom wall 23 is also sidewardly (that is, forwardly) displaced so that it is not directly aligned under the upright housing part 17. Hence, in operation, while dry feed will occupy and substantially fill both of the compartments 18 and 21, nevertheless the forward location of the discharge opening 25 and the corresponding valve plate 32 is such that the column or height of feed located on or above the valve plate 32 is generally governed solely by the height of the lower compartment 21, and thus the weight of the feed on the top of the valve plate 32 is minimized. Due to this forward offsetting of the discharge opening 25, the complete column weight of the feed in the upright top chamber 18 is thus not imposed on top of the valve plate 32. The feed in top chamber 18, however, can readily flow downwardly and forwardly into the lower chamber 21 due to the sloped rear wall part 29 which readily diverts the feed forwardly into the lower chamber 21.

In operation, the hog will contact the lower end of the actuator rod 34, such as by pushing it sidewardly with its snout. This causes the valve to angularly tilt relative to the vertical axis of the discharge opening 25, which tilting occurs about one side of the free edge 33 of the valve plate 32. This results in the valve plate becoming tilted relative to the bottom plate 23, thereby partially opening the discharge opening 25 so as to permit dry feed to flow downwardly therethrough.

At the same time, when the hog releases the valve element 32, the weight thereof, due to its being made of metal, causes it to resume its normally verticallyoriented closed position. However, during the angular displacement of the valve member as it moves between open and closed positions, the conical configuration of the valve plate 32 and the cuplike cavity formed therein tends to act like a scoop in that the raised open edge of the valve plate 32 tends to scoop the feed downwardly toward and through the discharge opening 25 as the valve element moves back towards its vertically aligned and closed position. In fact, dispensing of feed will occur only so long as the valve 31 is oscillated back-and-forth by the hog so as to cause the valve head 32 to repetitively scoop feed from the chamber 21 into the discharge opening 25. If the hog holds the valve 31 in a sidewardly displaced or open position, the dispensing of feed will normally stop. This configuration of the valve element 32 hence provides for control over the amount of feed dispensed.

Due to the presence of the elongate shroud 37, the hog's snout is maintained a substantial distance downwardly from the discharge opening 25. Hence, moisture carried on the hog's snout is safely maintained a substantial distance away from and below the feed discharge opening 25, and can not come into contact with the feed so as to prevent bridging.

Further, to control or limit the extent of upward lifting of the valve element, such as if the hog pushes the valve 31 upwardly from below, the dispensing device also preferably incorporates an adjustable stop structure 39 for controlling maximum upward opening of the valve 32. This stop 39 is formed substantially as an elongate threaded rod or screw member which is threadedly mounted in and projects vertically through the top wall 22 so that upper end is accessible for rotational adjustment. The lower free end of stop 39 is oriented directly vertically above the valve head 32, with the spacing between the closed valve head and the lower free end of the stop 39 being selectively adjustable. This thus provides an adjustable control over the amount of feed dispensed.

VARIATION

Referring to FIG. 4, there is illustrated a variation of the invention which is designed particularly for dispensing dry feed to piglets. With this variation, since the feed is normally not mixed with water, bridging is not a problem, but ease of dispensing feed is desirable.

In the variation of FIG. 4, there is illustrated a feeding device 110 for dispensing dry feed and which includes a housing 111 defining therein an interior feed storage chamber 112. The housing 111 comprises a generally tubular upright member 113, generally of cylindrical cross section The lower end of this member 113 is closed by an end or bottom wall 114. This bottom wall 114 is preferably of a generally cup-shaped configuration having an annular flange 115 which concentrically and fixedly secures the bottom wall to the upright housing member.

The bottom wall 114 has a discharge opening 116 formed therein and opening vertically downwardly therethrough. This discharge opening is of circular configuration and is generally aligned on the central vertical axis of the feeder device. The bottom wall, in surrounding relationship to the discharge opening, is of a generally truncated conical configuration which slopes upwardly as it projects outwardly for merger with the cylindrical side wall 113.

The feeding device 110 has a removable top cover 120 for sealingly closing off the upper end of the housing to keep the feed fresh. This cover can be manually removed when filling of the compartment with feed is desired.

The dispensing of feed from the feeder device is controlled by a valve member 117 which cooperates with the feed discharge opening 116 and has an actuating part 118 which projects downwardly therethrough. The construction of this valve member 117 is structurally and functionally the same as the valve member 31 described above relative to FIGS. 2 and 3.

The feeding device 110 also has an interior funnel structure 119 which is disposed in the lower part of the tubular wall 113 substantially directly above the head part 121 of valve member 117. This funnel structure 119 is of a truncated conical configuration which converges as it projects downwardly, whereby the upper end of the funnel, which is the end of maximum diameter, is fixedly secured to the inner wall of the tubular housing 113. The lower or apex end of the funnel 119 is truncated and defines a flow control opening 122 which is of smaller diameter than the discharge opening 116, and which is also of smaller diameter than the head 121 of the valve element. The opening 122 at the lower end of the funnel 119 is positioned only a very small distance directly above the valve head 121 when the latter is closed. The funnel thus also functions as a stop for limiting upward movement of the valve 117.

With this arrangement, the funnel 119 permits dry feed to bear against the valve head 121 only over a controlled area and hence minimizes the pressure of feed on the valve head and permits the valve to be readily displaced, such as tilted, so as to be opened to permit dispensing of feed.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A device for dispensing dry feed to animals, such as hogs, comprising:
    an upright housing defining therein an interior storage chamber for dry feed;
    said housing including a vertically projecting upper tubular housing part having a generally upright tubular side wall structure and defining an upper feed storage chamber therein, said housing also having a lower housing part which is fixedly secured to a lower end of said upper housing part and defines a lower feed storage chamber therein, said lower housing part projecting sidewardly relative to said upper housing part and defining thereon a bottom wall provided with a feed discharge opening which opens downwardly therethrough;
    animal-actuatable closure means supported on said housing for normally closing off said discharge opening to prevent discharge of feed therethrough, said closure means including a closure member having an enlarged platelike head provided at an upper end thereof and disposed above said bottom wall for normally closing off said discharge opening, and an elongate animal-contactable actuator fixed to said platelike head and projecting vertically downwardly therefrom through said discharge opening, said actuator projecting downwardly a substantial distance below said discharge opening and terminating in a free end;
    said upper housing part having a communication opening in said lower end thereof for communication with an upper portion of the lower feed storage chamber, and said discharge opening being sidewardly displaced so as to be in nonaligned and horizontally nonoverlapping relationship to said communication opening so that the height of the feed which rests on and is disposed above the platelike head is limited solely by the height of the lower storage chamber; and
    said housing including a sleevelike protective shroud fixed to and projecting downwardly from said bottom wall in generally concentric relationship with said discharge opening, said shroud projecting downwardly a substantial extent below said bottom wall but terminating short of the free end of said actuator so that said actuator projects vertically downwardly a limited extent beyond said shroud.

2. A device according to claim 1, wherein said platelike head is of a generally conical configuration which is generally aligned with and fixedly secured to an upper end of said actuator, said conical configuration diverging as it projects downwardly so as to terminate in a lower annular free edge which is adapted to contact an upper surface of said bottom wall in surrounding relationship to the discharge opening when the platelike head is in a closed position, said platelike head defining on the inside thereof a downwardly-opening cavity so that the platelike head can scoop dry feed from the interior storage chamber toward the discharge opening when the closure means is tiltably moved from an open position toward the closed position.

3. A device according to claim 2, wherein the platelike head has an upper surface which is of a truncated conical configuration so that the upper surface diverges radially outwardly as it projects axially downwardly, and wherein said actuator comprises an elongate rodlike member.

4. A device according to claim 3, wherein said lower housing part includes a side wall which slopes inwardly from a far side of the communication opening generally inwardly toward the discharge opening as said side wall projects downwardly for sidewardly diverting the feed as it flows downwardly from the upper storage chamber into the lower storage chamber.

5. A device according to claim 4, including adjustable stop means mounted on said housing and cooperating with said closure means for adjustably controlling the opening movement thereof.

6. A device according to claim 1, wherein said lower housing part includes a side wall which slopes inwardly from a far side of the communication opening generally inwardly toward the discharge opening as said side wall projects downwardly for sidewardly diverting the feed as it flows downwardly from the upper storage chamber into the lower storage chamber.

7. A device for dispensing dry feed to animals, such as hogs, comprising:
an upright housing defining therein an interior storage chamber for dry feed;
said housing having a generally upright tubular side wall, said housing also having a bottom wall provided with a feed discharge opening which opens downwardly therethrough;
animal-actuatable closure means supported on said housing and normally maintained in a closed position for closing off said discharge opening to prevent discharge of feed therethrough, said closure means including a closure member having an enlarged platelike head provided at an upper end thereof and disposed within said housing above said bottom wall for normally closing off said discharge opening, and an elongate animal-contactable actuator fixed to said platelike head and projecting vertically downwardly therefrom through said discharge opening, said actuator projecting downwardly a substantial distance below said discharge opening and terminating at a free end, said actuator being positioned so as to be contacted by the animal and pushed sidewardly to effect tilting of the closure member relative to the housing to permit dispensing of feed through the discharge opening; and
a funnel-like guide structure disposed within said storage chamber substantially directly above the closure member, said funnel-like structure being of a downwardly converging configuration terminating in a small flow control opening at its lower apex, said flow control opening being aligned directly above the platelike head and having a cross sectional area smaller than the cross sectional area of the platelike head for controlling the pressure applied on the platelike head by the feed in the storage chamber.

8. A device according to claim 7, wherein said platelike head is of a generally conical configuration which is generally aligned with and fixedly secured to an upper end of said actuator, said conical configuration diverging as it projects downwardly so as to terminate in a lower annular free edge which is adapted to contact an upper surface of said bottom wall in surrounding relationship to the discharge opening when the platelike head is in a closed position, said platelike head defining on the inside thereof a downwardly-opening cavity so that the platelike head can scoop dry feed from the interior storage chamber toward the discharge opening when the closure means is tiltably moved from an open position toward the closed position.

9. A device according to claim 8, wherein the platelike head has an upper surface which is of a conical configuration so that the upper surface diverges radially outwardly as it projects axially downwardly, and wherein said actuator comprises an elongate rodlike member.

10. A device according to claim 9, including stop means mounted on said housing and positioned substantially directly above but spaced a small vertical distance from the platelike head when the closure member is in a closed position for limiting upward displacement of the platelike head relative to the housing.

11. A device according to claim 7, wherein the lower apex end of the funnel-like structure is disposed a small vertical distance above the platelike head when the latter is closed so as to function as a stop and limit the upward opening movement of the platelike head.

12. A device according to claim 7, wherein the upright housing has a removable cover for normally sealingly closing off an upper end of the housing, the cover being removable to permit filling of the chamber with dry feed.

13. A device for dispensing dry feed to animals, such as hogs, comprising:
a hollow upright housing defining therein an interior storage chamber for dry feed, said housing having an upright side wall structure and a bottom wall provided with a feed discharge opening which opens downwardly therethrough;
animal-actuatable closure means supported on said housing and normally maintained in a closed position for closing off said discharge opening to prevent discharge of feed therethrough, said closure means including a closure member having an enlarged platelike head disposed within said housing above said bottom wall for normally closing off said discharge opening, and an elongate animal-contactable actuator fixed to said platelike head and projecting vertically downwardly therefrom through said discharge opening, said actuator projecting downwardly a substantial distance below said discharge opening and terminating at a free end, said actuator being positioned so as to be contacted by the animal and pushed sidewardly to effect tilting of the closure member relative to the housing to permit dispensing of feed through the discharge opening; and
said platelike head having an annular free edge which is adapted to contact an upper surface of said bottom wall in surrounding relationship to the discharge opening when the closure means is in said closed position, said platelike head defining on the inside thereof a downwardly-opening cavity which extends upwardly and inwardly from said annular free edge and which is in constant downward communication with said discharge opening so that the platelike head can scoop dry feed from the interior storage chamber toward the discharge opening when the closure means is tiltably moved from an open position toward the closed position.

14. A device according to claim 13, wherein said platelike head is of a generally conical configuration which is generally aligned with and fixedly secured to an upper end of said actuator, said conical configuration diverging as it projects downwardly so as to terminate in said annular free edge, said upper surface of said bottom wall being generally horizontally oriented.

15. A device according to claim 14, wherein the platelike head has an upper surface which is of a conical configuration so that the upper surface diverges radially outwardly as it projects axially downwardly, and wherein said actuator comprises an elongate rodlike member.

16. A device according to claim 15, including stop means fixedly mounted on said housing and positioned substantially directly above but spaced a small vertical distance from the platelike head when the closure means is in said closed position for limiting upward displacement of the platelike head relative to the housing.

17. A device according to claim 13, wherein said housing includes a sleevelike protective shroud fixed to and projecting downwardly from said bottom wall in generally concentric relationship with said discharge opening, said shroud projecting downwardly a substantial extent below said bottom wall but terminating short of the free end of said actuator so that said actuator projects vertically downwardly a limited extent beyond said shroud.

* * * * *